US006436289B1

(12) United States Patent
Johnstone (10) Patent No.: US 6,436,289 B1
(45) Date of Patent: Aug. 20, 2002

(54) VERTICAL MEMBRANE STORAGE SYSTEM AND METHOD OF STORING LIQUIDS USING THE SAME

(76) Inventor: Duncan Johnstone, 6440 Tucker Ave., McLean, VA (US) 22101

( * ) Notice: Subject to any disclaimer, the term of this patent is extended or adjusted under 35 U.S.C. 154(b) by 21 days.

(21) Appl. No.: 09/689,639

(22) Filed: Oct. 13, 2000

Related U.S. Application Data (60) Provisional application No. 60/201,671, filed on May 3, 2000, provisional application No. 60/197,001, filed on Apr. 13, 2000, and provisional application No. 60/159,506, filed on Oct. 15, 1999.

(51) Int. Cl.[7] .................................................. C02F 3/02
(52) U.S. Cl. ........................ 210/620; 210/758; 210/776; 210/170; 210/220; 210/242.1; 210/242.2; 210/242.3; 210/257.1; 210/258; 222/105; 405/64; 405/66; 405/68
(58) Field of Search ................................. 210/608, 620, 210/631, 747, 739, 758, 764, 776, 120, 170, 198.1, 205, 220, 221.2, 242.1, 242.2, 242.3, 257.1, 258; 222/105; 405/64, 68, 66

(56) References Cited

U.S. PATENT DOCUMENTS

| | | | | | |
|---|---|---|---|---|---|
| 3,113,699 A | * | 12/1963 | Crawford et al. | ........ | 137/236.1 |
| 3,114,384 A | * | 12/1963 | Quase | ......................... | 114/257 |
| 3,155,280 A | * | 11/1964 | Quase | ......................... | 222/105 |
| 3,389,559 A | * | 6/1968 | Logan | ......................... | 405/60 |
| 3,572,506 A | * | 3/1971 | Bandy et a. | ................. | 210/120 |
| 3,610,194 A | * | 10/1971 | Siegel | ......................... | 114/257 |
| 3,653,215 A | * | 4/1972 | Crucet | ......................... | 210/121 |
| 3,655,051 A | * | 4/1972 | Quase | ..................... | 137/236.1 |
| 3,674,687 A | * | 7/1972 | Quase | ..................... | 137/236.1 |
| 3,701,428 A | * | 10/1972 | Lesh | ......................... | 210/170 |
| 3,966,614 A | * | 6/1976 | Ayers | ...................... | 210/242.3 |
| 4,048,070 A | * | 9/1977 | Propp | ......................... | 210/172 |
| 4,892,440 A | * | 1/1990 | Regan | ......................... | 137/110 |

* cited by examiner

Primary Examiner—Peter A. Hruskoci
(74) Attorney, Agent, or Firm—Patrick A. Doody; Hunton & Williams

(57) ABSTRACT

A vertical membrane storage system including a flexible membrane housing having an upper enclosed portion capable of storing a fluid and a lower open portion for receiving the fluid is disclosed. The storage system also includes a flotation tube disposed above and connected to the upper enclosed portion, and an anchor having receiving means for receiving a fluid disposed concentrically therein, whereby the anchor is connected to and encloses the lower open portion of the flexible membrane. The vertical membrane storage system can be used for storing a variety of fluids including, but not limited to, overflow sewage, oil-contaminated water, and the like.

19 Claims, 4 Drawing Sheets

VERTICAL MEMBRANE STORAGE SYSTEM AND METHOD OF STORING LIQUIDS USING THE SAME

This applications claims benefit of Provisional No. 60/159,506 filed Oct. 15, 1999 and claims benefit of Provisional No. 60/197,001 filed Apr. 13, 2000 and claims benefit of Provisional No. 60/201,671 filed May 3, 2000.

BACKGROUND OF THE INVENTION

1. Field of the Invention

The invention relates to a vertical membrane storage system, and to a method of storing a fluid using the storage system. Specifically, the invention relates to a submerged storage system that is capable of storing any number of fluids, including, inter alia, excess sewage emanating from a sewage system or a combined sewage-storm water system during periods of heavy flow.

2. Background of the Invention

Sewer overflow can cause significant problems, including individual home flooding with sewage, as well as dumping overflow into and consequently polluting local waterways. This overflow occurs when the flow capacity of a sewer system is exceeded by the rainwater in-flow rate into the system for combined sanitary and storm sewer systems. Sewage backup and local water pollution is present in most storm sewer systems where the storm sewers are rarely of a sufficient size to accommodate unusually heavy rainstorms.

When an overflow is encountered, the local municipalities prevent overload of the sewage treatment plant, as well as sewer backup into homes by diverting the excess flow to local waterways, such as rivers, lakes, large retention ponds, and the oceans. This diversion creates an enormous environmental hazard. Moreover, for many inland cities, there are no large natural systems that can accommodate the overflow. As a consequence, these inland cities must rely on very expensive underground storage systems.

To minimize overflow and backup problems from a storm sewer system, a number of expensive methods have been heretofore proposed. Where there are adequate spaces and tax revenues available for doing so, water drainage ponds and lakes have been constructed to collect excess rainwater run-off before the water can gain direct access to the storm sewer system. Such drainage ponds or lakes are usually not feasible. Moreover, recently it has been discovered that such drainage ponds and lakes have created drinking water contamination problems if the area obtains its drinking water from underground wells or streams into which the water in the drainage ponds and lakes can drain.

A municipality also can minimize storm sewer backup and overflow by increasing the size of the storm sewers that make up a citywide storm sewer system. This solution is extremely expensive, however, and it is an impractical solution to the problem, unless the storm sewer system has to be replaced for other reasons.

One costly solution that attempts to solve the problem of sewage backup into an individual's home is proposed in Regan, U.S. Pat. No. 4,892,440. Regan proposes burying large water storage tanks in the ground to handle the overflow. The water backup system described therein also includes a complicated system of float switches, valves and pumps to both divert the water to the storage tanks, and then to withdraw the overflow from the tanks when the overflow conditions have subsided. Regan's backup prevention system is quite costly to construct, and once in the ground, cannot readily be moved or replaced. Moreover, it is very expensive to fix leaks that inevitably develop in the storage tanks.

It is known to divert overflow water and sewage to a flexible channel that is capable of expanding when filled with the overflow liquid. For example, German patent application DE 3,426,789 discloses a plastic sack having an opening to receive supply and to discharge overflow sewage water. Overflow still may occur, however, if the plastic sack is not large enough to accommodate the excess flow, and an overflow is provided between the sewer and the plastic sack. In addition, undesirable odor may emanate from the sack because the sewer is in direct contact with the atmosphere. If the overflow capacity of the plastic sack is exceeded, non-clarified sewage still can contaminate the natural waters.

Lesh, U.S. Pat. No. 3,701,428 discloses a sewage disposal unit that comprises a plurality of flexible sewer pipes connected to a flexible plastic septic tank, or tanks, submerged in a body of water adjacent the sewer mains. Lesh states that the pressure of the body of water serves to support the submerged plastic septic tanks which avoids extensive excavation or building concrete tanks. The flexible system of Lesh is limited in size, and when its capacity is exceeded, overflow will still occur.

Clemens, WO 98/03742 proposes another flexible channel for storing sewage and clarifying the sewage in the event of heavy rainfall. Clemens utilizes a flexible plastic material, such as a geotextile (Perl E), and tension ropes to support the flexible material when filled. While providing a cheaper and more mobile solution to the overflow problem than that proposed in Regan, Clemens' system does not effectively clarify the sewage, and it is difficult to fill and withdraw liquid from the system. The tension ropes also cause considerable stress at the junction of the tension ropes and the plastic material that can cause rips or tears. The tension ropes also may cause the deposit of excess sludge that is difficult to remove.

In addition to the pollution problems associated with overflow of sewage, there are other significant environmental problems associated with the earth's natural water system. It is generally accepted that our oceans are losing life. Les Watling of the University of Maine has hours of videotape showing "before-and-after" footage of the ocean, and the effects of trawling: showing gardens of life in one segment (before), and mud and debris in the other (after).

In vast near-coastal areas and in semi-enclosed seas the water itself has been rendered sterile. The problem is believed to be caused by nutrient pollution, the smothering deluge of sewage, manure, and chemical fertilizers from land-based activities. Rising populations and the increasingly intensive agriculture and livestock operations needed to feed them have caused an explosion in nutrient run-off. This problem is even more exacerbated by the dramatic increase in bio-engineered fertilizers and feedstocks, which are now dumping numerous unknown organisms into our waters. Although some nutrients can be beneficial to our waters, too large a quantity poisons the waterways. Phytoplankton productivity is limited by the availability of nutrients in sea water, and where there are excessive levels, these microscopic algae explode in such massive blooms that grazers cannot keep up. The dead algae fall to the bottom to be decomposed by bacteria, a process that consumes large amounts of oxygen, so much that often little or none is left to sustain anything else. This condition is called hypoxia. When hypoxic conditions occur, all animal life that cannot swim away suffocates. This is how the Black Sea's shallow life-bearing shelves were laid waste, setting the stage for the ecological collapse of the entire basin. Hypoxia also has become a chronic problem in the Gulf of Mexico, where a seven thousand square mile "dead zone" appears off the Louisiana and Texas coasts during the spring and summer, disrupting shrimp and fish migrations, and wiping out bottom fauna. Seasonal hypoxia affects many other natural waterways, including, for example, the Chesapeake Bay, New York Bight, the Adriatic, North, and Baltic Seas, the Yellow Sea, and the like.

Other pollution exists as well. For example, toxic chemicals have for years been dumped into our vast oceans. Paints used on ships to keep barnacles and other parasites from clinging to the ship's hulls become dissolved in the water and ingested by the local marine life. Moving marine life from one ecosystem to another also creates a great deal of pollution.

The most common agents of what scientists call "invasive species transfer" are oceangoing tankers and container ships. When light on cargo, most ships are obliged to pump water into their holds to maintain their seaworthiness. This ballast water contains numerous plants and animals, some as adults, but most in the form of eggs, larvae, or juveniles. On reaching its destination halfway around the world, a ship then will discharge some or all of its ballast water and, in the process, introduce huge numbers of alien species to the surrounding environment. Worldwide, the National Research Council estimates that three thousand species are picked up in ballast water every day. The species that survive the lengthy trip, and then the new environment become established. Lacking natural predators or having overwhelming advantages over their prey, some intruders completely take over, exterminating competitors and turning the ecosystem upside down.

The expression "invasive species transfer" denotes living plants, animals or bacteria that have accidentally or purposefully been introduced into a new habitat and have the potential to devastate the native plants, animals, and organisms, or to create ecological monsters like zebra mussels, lampreys, Asian snails, European crabs (green), and the bright green sea grass (Caulerca Taxifola), which is toxic to all organisms that attempt to ingest it. Other examples include the Mnemiopsis Leidyl (comb jellyfish), a benign native of the Northeastern United States, which have killed most living things in the Black Sea.

Many microscopic spores, eggs, animals, etc. that are transferred by the bilge and ballast water are benign, especially when compared to the Pfiesteria Piscicida (fish killer) that can metamorphose into 24 different beings, most of which are capable of devouring most living things. Although these "morphs" are microscopic, they are dangerous even to mankind. They are partial also to sewage, blood and offal from slaughterhouses for chickens, hogs, cattle, and horses. These fish killers also can kill a fish from a distance of three or four feet and dissolve it simultaneously.

These invasive species transfer invasions are becoming increasingly commonplace as ships become larger and more numerous. San Francisco Bay, a busy shipping port, is home to at least 212 exotic species. The fish population is now a bizarre mix of Mississippi catfish, East Asian gobies, Japanese carp, and aquarium goldfish. The bottom is controlled by Chinese mitten crabs (which can harbor human parasites and whose burrowing causes levees to collapse) and Asian clams (which filter out virtually all plankton, starving out native fish). A new species takes hold in the Bay every twelve weeks on average. Exotic invaders tend to wreak the most havoc in ecosystems already damaged by other stresses. A North American bristle worm now dominates the bottom of Poland's highly polluted Vistula lagoon.

Another increasing source of pollution in our vast waterways is caused by oil spills, as well as oil and fuel leaks from seaworthy vessels. While the massive oil spills, like the Exxon Valdez, provide an immediate and glaring source of pollution, waste from oil ships has been a problem for a considerable time. It is not possible under present stringent regulations for ships to deposit bilge water, or other water that may contain oil into the ocean or other waterways. Thus, oil-water mixtures must be disposed of directly in public sewers or waterways in view of their oil content. Furthermore the recovery value of the oil in the water is quite small.

Propp, U.S. Pat. No. 4,048,070 describes a system that provides a holding tank for the wastewater received from ships. The holding tank is attached to a series of decantation tanks, which in turn are connected to separator tanks. The system of Propp is very expensive and difficult to construct and employ.

Other forms of contamination of natural or man-made waterways can come from fish farms. Nearly 20% of the fish and seafood consumed today now is raised on farms even from seed, fingerlings, very young mollusks or eggs that are raised on commercial feed formulated to provide adequate nutrients or on natural food organisms grown through water fertilizing techniques. Because potentially polluting and disease-bearing waste accumulates in any fish farm, it must be disposed of through elaborate water circulation systems and filtration. Some filtration systems harness bacteria that convert ammonia, which the fish secrete through their gills into nitrates. It would be desirable to provide a fish farming system that did not require such complicated and expensive disposal systems.

Finally, many impoverished nations do not have adequate drinking water, and do not even have an adequate sewage disposal system. Sewage is dumped directly into the water that is ultimately used for drinking, causing dysentery, cholera, and many other bacterial and viral diseases. Effectively treating the sewage not only may solve the drinking water problem, but also may provide fertilizer to assist growth of vegetation, rice, and other staple goods.

SUMMARY OF THE INVENTION

There is a need to solve the pollution problems noted above. For example, there is an increasing need to provide a solution to the overflow of sewage into natural waterways. There also exists a need to alleviate, ameliorate, or completely eliminate the problems associated with invasive species transfer. There also exists a need to prevent the unnecessary pollution caused by oil spills and/or excess oil or fuel spillage into the natural waterways. Finally, it would be desirable to provide a means by which people living in impoverished nations could be supplied with clean drinking water, and to provide a mechanism to treat the waste sewage.

It is therefore a feature of an embodiment the present invention to provide a vertical membrane storage system including a flexible membrane housing having an upper enclosed portion capable of storing a fluid, and a lower open portion for receiving the fluid. The storage system also includes a flotation tube disposed above and connected to the upper enclosed portion, and an anchor having receiving means for receiving a fluid disposed concentrically therein, whereby the anchor is connected to and encloses the lower open portion of the flexible membrane.

In accordance with another feature of an embodiment of the invention, there is provided a submerged overflow storage system comprising at least one vertical membrane storage system as described above. The submerged overflow storage system also includes an inflow pipe connected to the receiving means of the at least one vertical membrane storage system, an inflow overflow valve disposed within the inflow pipe, an outflow pipe connected to the inflow pipe, and an outflow valve disposed within the inflow pipe and the outflow pipe.

It is an additional feature of an embodiment of the present invention to provide a method of storing a fluid that includes injecting a fluid into the above-described vertical membrane storage system via the receiving means. It is an additional feature of an embodiment of the invention to provide a method of preventing invasive species transfer comprising emptying ballast and/or bilge water from a sea-going vessel into the above-described submerged overflow storage system.

These and other features of the invention will be readily apparent to those skilled in the art upon reading the description of preferred embodiments that follows.

BRIEF DESCRIPTION OF THE DRAWINGS

In the drawings, like numerals represent like embodiments.

DESCRIPTION OF PREFERRED EMBODIMENTS

Provisional Patent Application No. 60/159,506, filed on Oct. 15, 1999, and entitled "Vertical Membrane Storage System," provisional patent application No. 60/197,001, filed Apr. 13, 2000, and entitled "Vertical Membrane Storage System," and provisional patent application No. 60/201,671, filed May 3, 2000, and entitled "Submerged Vertical Membrane Raw-Sewage Module, Temporary System for Bypassing Without Contamination," each are incorporated herein by reference in their entirety.

The present invention relates to a vertical membrane storage system including a flexible membrane housing having an upper enclosed portion capable of storing a fluid, and a lower open portion for receiving the fluid. The storage system also includes a flotation tube disposed above and connected to the upper enclosed portion, and an anchor connected to and enclosing the lower open portion of the flexible membrane. The anchor has a receiving means for receiving a fluid disposed concentrically therein.

Figure 1:
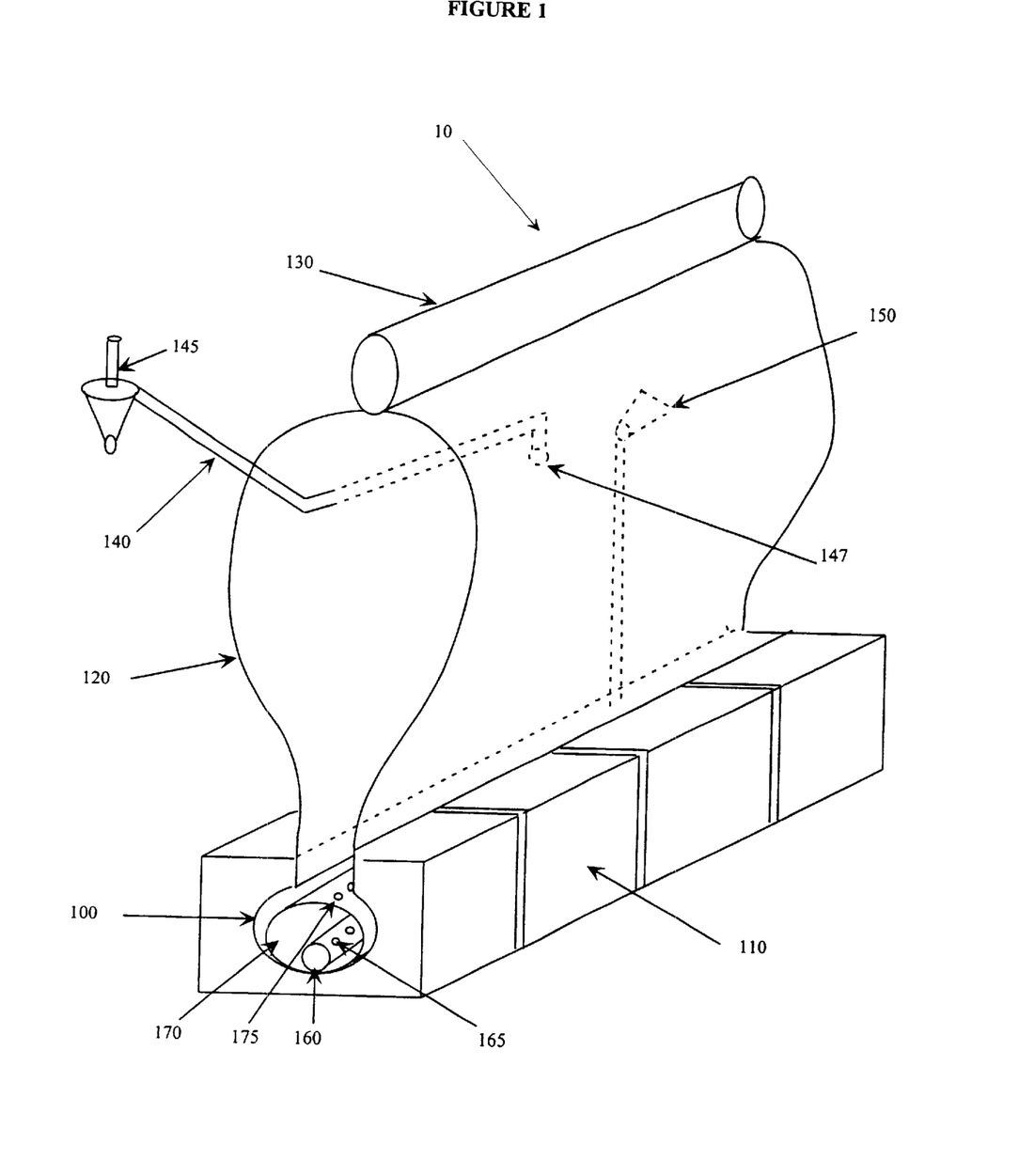
FIG. 1 illustrates a preferred vertical membrane storage system according to the invention.

A particularly preferred vertical membrane storage system is illustrated in FIG. 1. As shown therein, the vertical membrane storage system 10 is comprised of at least three component parts: flotation tube 130, flexible membrane housing 120, and anchor 110. The flotation tube 130 and flexible membrane housing 120 can be comprised of any flexible material that is capable of retaining fluid (e.g., air, sewage, oil contaminated water, drinking water, etc.), while at the same time keeping out fluid that may exist outside the flotation tube 130 and flexible membrane housing 120. If the vertical membrane storage system were stored above ground, helium or other light gases could be used in flotation tube 130 to maintain the storage system in a vertical alignment.

It is preferred in the invention that flotation tube 130 and flexible membrane housing 120 be comprised of a flexible polymeric material, and more preferably a multilayer flexible polymeric material. Suitable materials include polyester felt, polyethylene, polypropylene, polyurethane, Gore-Tex®, rubbers, and the like. Most preferably, the flotation tube 130 and flexible membrane housing 120 are comprised of a multilayer polyester felt having adhered thereto a water-impermeable film.

Anchor 110 can be comprised of any material capable of anchoring the vertical membrane storage system and preventing it from floating away to the surface or with existing currents. Anchor 110 also can be comprised of any material capable of enclosing the lower end of flexible membrane housing 120. Preferably, anchor 110 is made of a plurality of modules as shown in FIG. 1, which enables its construction and assembly either on-site or at another location, and then the modules transported to the desired storage area and assembled on-site. For submerged storage systems, a diver, or the like can assemble anchor 110 underwater. Anchor 110 can be made of concrete, steel, plastic, or any other material capable of withstanding the environment in which it is used. Most preferably, anchor 110 is comprised of a plurality of concrete modules.

Anchor 110 comprises a receiving means 100 for receiving the fluid to be stored in the vertical membrane storage system. Receiving means 100 preferably is comprised of an opening disposed concentrically through anchor 110. More preferably, receiving means 100 comprises a tube 170 disposed concentrically within the anchor, wherein tube 170 comprises an inlet disposed at one end for receiving a fluid. Tube 170 can be any tube capable of carrying a fluid, such as plastic, PVC, metal, steel, etc. Preferably, tube 170 is a perforated steel tube, whereby the perforations 175 enable liquid and solid transfer to and from the tube and the flexible membrane housing 120. Perforated tube 170 and anchor 110 can be designed so that tube 170 can be screwed into anchor 110.

By using a tube 170 having perforations 175 that enable liquid and solid transfer, the vertical membrane storage system is capable of storing and disinfecting sewage. Sewage can be injected into vertical membrane storage system 10 via tube 170, and the sewage (containing liquids and solids) flows upwards through perforations 175, and into flexible membrane 120 thereby filling the membrane. While the sewage is stored in flexible membrane 120, solids will invariably settle to the bottom of the flexible membrane. These solids can fall through perforations in tube 170, and then the solids can be back-flushed with water out of tube 170 and into a sewage treatment facility, or the like.

Vertical membrane storage system 10 can treat sewage while it is being stored. For example, bacteria and other disinfectant chemicals or microbes can be injected into a filled flexible membrane housing 120 via receiving means 100. In addition, or alternatively, vertical membrane storage system 10 can function as an aerator by injecting air into the fluid stored in flexible membrane 120. In this embodiment, the storage system also includes an air pipe 160 comprising perforations 165. The air pipe 160 preferably is disposed concentrically within the receiving means 100 or the tube 170, and the air pipe 160 comprises an open inlet disposed at one end, and a cap at the other end. The cap can be removed, an external air source connected to air pipe 160, and then air can be injected into the open inlet of air pipe 160, through perforations 165, and into the sewage stored in flexible membrane 120.

In this embodiment, it is preferred that vertical membrane storage system 10 also comprise an air release valve 140 and a skimmer 150 disposed within flexible membrane housing 120. Air release valve 140 serves to percolate the air bubbling through the fluid medium stored in flexible membrane housing 120. It is preferred in this embodiment of the invention that air release valve 140 be comprised of a ball valve 147 disposed within the flexible membrane housing 120, and an air valve 145 in fluid communication with the ball valve and disposed outside the flexible membrane housing. Ball valve 147 and air valve 145 can be actuated remotely, as required. Skilled artisans are capable of designing a suitable system of controllable valves, using the guidelines provided herein.

It also is preferred that air valve 145 floats on the surface of the water when a submerged system is employed. In addition, skimmer 150 can be any skimming device that is capable of picking up solid debris floating on top of the liquid disposed within the flexible membrane housing 120, and transferring the solid debris to the receiving means 100, preferably tube 170, and out of the system. The use of air release valve 140 is not required, however, especially if flexible membrane housing 120 were comprised of a material that permits air to flow out of the system and prevents water from entering the system.

Vertical membrane storage system 10 can be designed to be practically of any size or shape. While FIG. 1 depicts an oblong oval-shaped flexible membrane housing 120, when filled, other shapes are contemplated by the invention. The size of vertical membrane storage system 10 can be determined depending on its desired end use, and skilled artisans are capable of designing the system to have any size, using the guidelines provided herein. Because of the modular nature of the vertical membrane storage system 10, its component parts can be fabricated anywhere, flown or otherwise transported to its desired location (anchor 110 modules can be fabricated on-site, if desired), and assembled on site by local technicians.

Depending on the particular needs of the system, flotation tube 130 and flexible membrane housing 120 can be of any suitable size. For example, flotation tube 130 can be anywhere from about 10 to about 500 meters long, and from about 0.25 to about 5 meters in diameter, preferably, from about 30 to about 400 meters long, and from about 1 to about 3 meters in diameter, and more preferably, from about 100 to about 350 meters long and from about 1 to about 2 meters in diameter. Flexible membrane housing 120 can be anywhere from about 10 to about 500 meters long, and from about 2 to about 25 meters high, preferably from about 30 to about 400 meters long, and from about 4 to about 15 meters high, and more preferably, from about 100 to about 350 meters long, and from about 6 to about 10 meters high. Flexible membrane housing 120 having these dimensions is capable of storing anywhere from about 10,000 to well over 1,000,000 gallons of fluid.

Vertical membrane storage system 10 can be used in a variety of ways to prevent pollution of our natural waterways, to store vast amounts of clear drinking water for impoverished nations to draw from, or to farm fish. For example, at least one vertical membrane storage system can be arranged in series, in parallel, or otherwise, and submerged in a body of water, such as a pond, a lake, a deep river, an ocean, or a man-made trench or retention pond filled with water. Submerging vertical membrane storage system 10 provides an effective overflow storage system that is out of sight from the public, is unobtrusive, and does not produce substantial undesirable odors.

At least one vertical membrane storage system 10 also can be submerged in a body of water and connected to a detachable submerged connection tube thereby making the system portable. The system therefore can be moved from place to place as desired. For example, the storage system can be transported to a large oil spill, connected to a surface skimmer, and vast quantities of oil-contaminated water on the surface can be stored until a treatment vessel arrives to withdraw the contaminated water and treat it. Alternatively, the portable system can be transported to an impoverished nation to store sewage until a seaworthy sewage treatment vessel arrives to treat the contaminated water, thereby preserving the waterways surrounding the impoverished nation. Treatment of the sewage may generate much needed fertilizers for the impoverished nation.

The storage system also can be used to farm fish whereby fish are hatched and grown in the controlled environment within the flexible membrane housing 120. Another use for the storage system is to store clean drinking water for impoverished nations to draw upon when needed. The storage system also can be used to prevent invasive species transfer by placing the system strategically in large ports. In this context, ocean-going vessels can discharge their bilge and/or ballast water (which may have been picked up thousands of miles away) into the portable storage system. Those skilled in the art can envision a myriad of other possible uses for the vertical membrane storage system 10 of the present invention.

Figure 2:
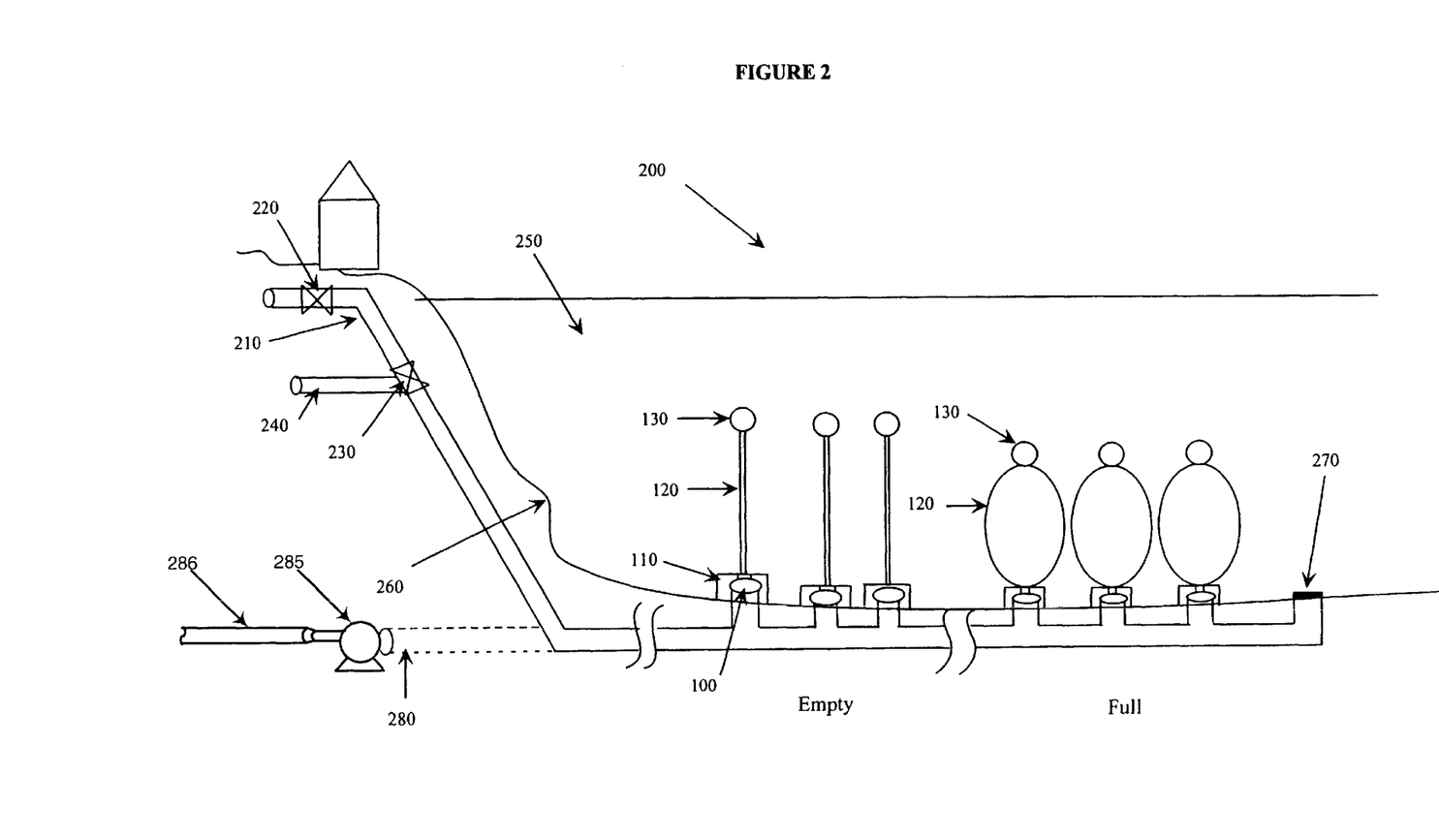
FIG. 2 is a plan view illustrating a preferred submerged overflow storage system according to the invention.

FIG. 2 illustrates a preferred submerged overflow storage system 200 according to an additional embodiment of the invention. This embodiment of the invention can be used to divert overflow from a storm sewer system whereby during periods of heavy rainfall, sewage flow is diverted to inflow pipe 210 by activating inflow overflow valve 220. The submerged overflow storage system 200 preferably comprises at least one vertical membrane storage system 10 as shown in FIG. 1. Although FIG. 2 depicts three vertical membrane storage systems in series, those skilled in the art will appreciate that any number of systems can be arranged in a variety of arrangements. The submerged overflow storage system 200 preferably is submerged in a large body of water 250 near the bottom of the body of water, and a sufficient distance from the sloping side 260.

The submerged overflow storage system 200 comprises an inflow pipe 210 connected to the receiving means 100 of the at least one vertical membrane storage system. To divert flow into the storage system, an inflow overflow valve 220 preferably is disposed within the inflow pipe. When the fluid in the storage system is ready to be discharged, it can be discharged via outflow pipe 240 connected to the inflow pipe, by activating an outflow valve 230 that is disposed within the inflow pipe 210 and in fluid communication with the outflow pipe 240. Outflow pipe 240 can be used for diverting stored fluid to a high-level sewer system. For a sewer system 286 that is vertically disposed below the receiving means 100 of the at least one vertical membrane storage system, the storage system further comprises a pump 285 connected to outflow pipe 280 for pumping fluid from the at least one vertical membrane storage system to the outflow pipe 280. Those skilled in the art will appreciate that the system shown in FIG. 2 is a particularly preferred embodiment of the invention and that many modifications may be made thereto. For example, inflow pipe 210 and outflow pipe 240 can be the same pipe whereby the fluid enters and exits the submerged overflow storage system via the same conduit. Overflow valve 220 and outflow valve 230 also could be one and the same valve.

FIG. 2 illustrates a plurality of vertical membrane storage systems in the empty state, and when full. As can be seen, when full, the vertical membrane storage system is lower in the body of water 250 than when empty, because the weight of the fluid in flexible membrane housing 120 draws flotation tube 130 down towards anchor 110. Inflow pipe 210 is provided with an end cap 270 that can be removed to back-flush the system, or to add additional vertical membrane storage systems, if needed.

Figure 3:
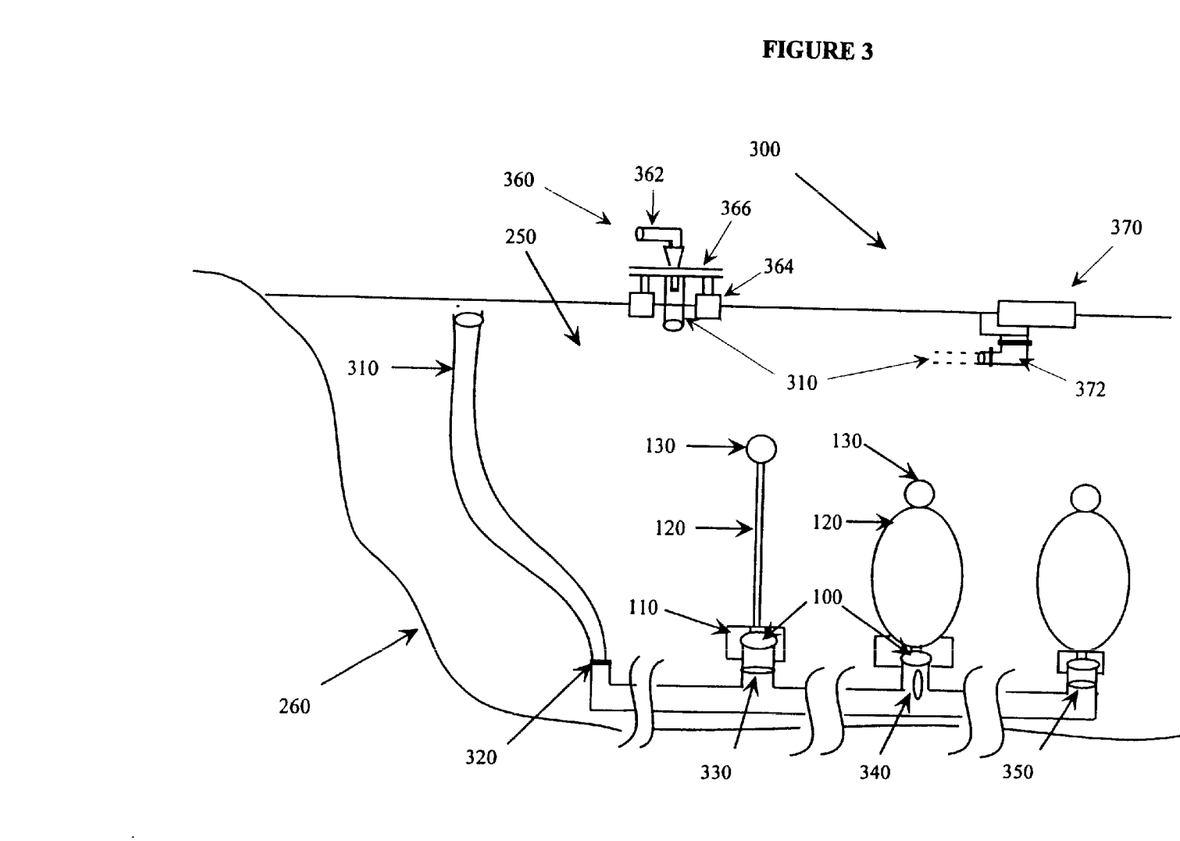
FIG. 3 is a plan view illustrating a preferred portable submerged storage system submerged in a body of water according to the invention.

The submerged storage system 200 also preferably includes a receiving means valve (330, 340, 350 in FIG. 3) disposed within the receiving means 100 of the at least one vertical membrane storage system, and a valve actuating means (not shown) disposed within the receiving means for actuating the receiving means valve. As shown in FIG. 3, as the at least one vertical membrane storage system is empty, receiving means valve 330 is in the closed position, and when being filled or emptied, receiving means valve 340 is in the open position. Upon being filled, receiving means valve 350 again is in the closed position to keep fluid within flexible membrane housing 120.

FIG. 3 illustrates a preferred portable submerged storage system 300 submerged in a body of water 250. In essence, portable submerged storage system 300 is the same as submerged storage system 200, except that it is not fixedly connected to an inflow pipe 210. Rather, the portable submerged storage system 300 is connected to a submerged connection tube 310. Submerged connection tube 310 can be connected and disconnected to the storage system via swivel connection joint 320. Any type of connection can be used as swivel connection joint 320 so long as it is capable of connecting the submerged storage system to submerged connection tube 310.

As shown in FIG. 3, the vertical membrane storage system on the left of the three shown (three systems are shown merely as a matter of convenience) is empty. Thus, receiving means valve 330 is in the closed state. When an external source is connected to connection tube 310 to inject fluid into the vertical membrane storage system, receiving means valve 340 would be in the open position, as shown by the vertical membrane storage system in the center of FIG. 3. To prevent leakage back into connection tube 310 after filling, receiving means valve 350 is closed after the system has been filled, as shown by the vertical membrane storage system on the right of FIG. 3. The receiving means valves 330, 340, and 350 can be actuated by a valve actuating means (not shown) capable of operating the valves when the storage system is empty, during filling, after the system has been filled, and then during subsequent draining. Those skilled in the art are capable of designing suitable valve actuating means, using the guidelines provided herein.

FIG. 3 shows two out of the numerous possible connections that can be made at the surface of the body of water 250 to enable filling and emptying the portable submerged storage system 300. For example, the floating platform 360 shown on the left hand side of FIG. 3 can be used by any external device to dock, and then fill, empty, etc. fluid into and out of the portable submerged storage system 300. Suitable external devices include, but are not limited to, sea-going vessels that can use the storage system to store bilge and/or ballast water for further processing, as needed. Such use would prevent invasive species transfer that is so prevalent in our major ports today. Another external device could include an ocean-going sewage treatment plant, or a large vessel carrying potable water to be stored and used by an impoverished nation, or a nation suffering from severe weather damage to its water system. Those skilled in the art will appreciate the numerous external devices that could be used in the present invention.

Floating platform 360 serves to connect the portable submerged storage system 300 to an external device. Any arrangement can be used to connect the external device to the submerged connection tube 310. A preferred arrangement is shown in FIG. 3. The floating platform 360 shown therein includes an ambient connection tube 362 disposed within the floating platform and connected to the submerged connection tube 310. The ambient connection tube 362 connects to an external device. Those skilled in the art can design ambient connection tube 362 to connect to any desired external device using the guidelines provided herein. A platform 366 also is provided, and is connected to and supports the ambient connection tube 362. Finally, floating platform 360 includes at least one floatation pontoon 364 that is at least partially submerged in the body of water 250, and is connected to the platform 366.

Another external device that can be used to connect to submerged connection tube 310 is ambient floating skimmer 370, shown on the right hand side of FIG. 3. The ambient floating skimmer 370 can be used for any number of purposes, one preferred use being to divert contaminated surface water (from chemical or oil spills) into the portable submerged storage system 300 so that it can be stored and then withdrawn when a treatment vessel is available. Thus, should a major oil spill occur, the portable submerged storage system can easily be flown to the spill, assembled, and then the contaminated water quickly diverted into the storage system. This will contain the oil spill and significantly reduce harm to the environment.

As shown in FIG. 3, ambient floating skimmer 370 is at least partially submerged in the body of water 250. Ambient floating skimmer 370 can be connected to the submerged connection tube 310 via a swivel connector 372 disposed between the submerged connection tube 310 and the ambient floating skimmer 370. Again, any type of connection can be used as swivel connector 372 so long as it is capable of connecting the ambient floating skimmer 370 to submerged connection tube 310.

Figure 4:
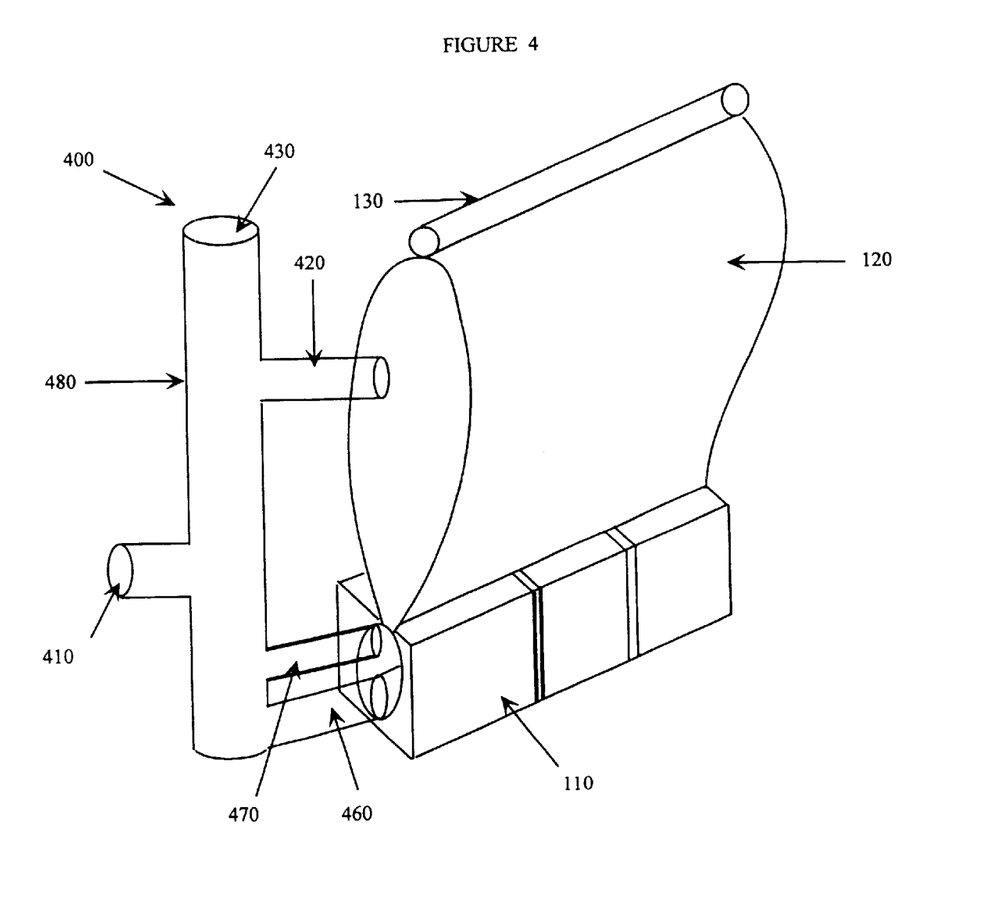
FIG. 4 illustrates an aerator apparatus attached to the vertical membrane storage system of FIG. 1.

Turning now to FIG. 4, FIG. 4 illustrates an aerator apparatus 400 attached to the vertical membrane storage system 10 of FIG. 1. The aerator apparatus 400 can be used to aerate sewage or other contaminated fluid stored in flexible membrane housing 120. Preferably, aerator apparatus 400 is connected to the vertical membrane storage system 10 at the end opposite the end used to fill and empty the system. For example, aerator apparatus 400 would be connected to the vertical storage system 10 at the end where the cap is disposed on air pipe 160. The cap can easily be removed, as well as any closing means present on the closed end of receiving means 100 (and perforated steel tube 170), and aerator apparatus 400 connected using techniques readily available to those skilled in the art.

Aerator apparatus 400 preferably comprises an aerator housing 480 disposed outside the flexible membrane housing 120, whereby the aerator housing 480 has an inlet pipe 430 for receiving air or water. A turbilizing pipe 420 preferably is connected to and in fluid communication with the aerator housing 480 and the flexible membrane housing 120. Turbulizing pipe 420 can be used to provide agitation to the fluid in flexible membrane housing 120, using any technique readily available to those skilled in the art (e.g., spinning rotor blades, high pressure air, etc.). Aerator apparatus 400 also preferably includes an aerator air pipe 460 connected to and in fluid communication with the aerator housing 480, and to the end of the air pipe 160 having the cap, whereby the cap has been removed. Aerator apparatus 400 also preferably includes an aerator fluid pipe 470 connected to and in fluid communication with the aerator housing 480 and the receiving means 100 (and/or perforated steel tube 170 (FIG. 1)). Finally, aerator apparatus 400 may include exhaust pipe 410 that can serve to exhaust fluid and/or gas from the system.

In operation, aerator apparatus 400 can receive air or fluid through inlet pipe 430. The air or fluid can be used to back-flush the system of solids as they accumulate on and in perforated steel tube 170 (see FIG. 1). Alternatively, a fluid source can be connected to the vertical membrane storage system on the side opposite aerator apparatus 400 and used to back-flush the system, whereby the accumulated solids exit aerator apparatus 400 through exhaust 410.

As an aerator, air would enter the aerator apparatus 400 from an external source via inlet pipe 430, and then be directed into air pipe 160 via aerator air pipe 460. The air then can percolate through the perforations 165 in air pipe 160 (see, FIG. 1) and bubble up and through the contaminated fluid in flexible membrane housing 120. Any type of bacteria, biocide or other biological material that aids in aeration of contaminated fluids could be added to the contaminated fluid during aeration. In this embodiment, the contaminated fluid can be effectively treated without harm to the environment.

As mentioned above, the uses for the vertical membrane storage system 10, submerged overflow storage system 200, portable submerged storage system 300, and aerator housing 400 are legion. All such uses described herein, as well as others that will be readily apparent to those skilled in the art are contemplated by the present invention.

While the invention has been described in detail with reference to the particularly preferred embodiments described herein, those skilled in the art will appreciate that various modifications may be made thereto without departing from the spirit and scope thereof. All documents described above are incorporated by reference herein in their entirety.

What is claimed is:

1. A vertical membrane storage system comprising:
    a. a flexible membrane housing having an upper enclosed portion capable of storing a fluid, and a lower open portion for receiving the fluid;
    b. a flotation tube disposed above and connected to the upper enclosed portion;
    c. an anchor connected to and enclosing the lower open portion of the flexible membrane; and
    d. a receiving means for receiving a fluid disposed concentrically within the anchor.

2. The storage system as claimed in claim 1, wherein the receiving means comprises a tube disposed concentrically within the anchor, wherein the tube comprises an inlet disposed at one end for receiving a fluid.

3. The storage system as claimed in claim 2, wherein the tube is a perforated steel tube, whereby the perforations enable liquid and solid transfer to and from the tube and the flexible membrane housing.

4. The storage system as claimed in claim 1, further comprising:
    e. an air pipe comprising perforations disposed concentrically within the receiving means, wherein the pipe comprises an open inlet disposed at one end, and a cap at the other end.

5. The storage system as claimed in claim 4, further comprising:
    f. an air release valve comprising a ball valve disposed within the flexible membrane housing, and an air valve in fluid communication with the ball valve and disposed outside the flexible membrane housing; and
    g. a skimmer disposed within the flexible membrane housing.

6. The storage system as claimed in claim 5, further comprising an aerator device, the aerator device comprising:
    an aerator housing disposed outside the flexible membrane housing, the aerator housing having an inlet pipe for receiving air or water;
    a turbulizing pipe connected to and in fluid communication with the aerator housing and the flexible membrane housing;
    an aerator air pipe connected to and in fluid communication with the aerator housing and the end of the vertical membrane storage system air pipe having the cap, whereby the cap has been removed; and
    an aerator fluid pipe connected to and in fluid communication with the aerator housing and the receiving means.

7. A method of treating sewage by aeration comprising:
    storing sewage in the storage system as claimed in claim 6;
    injecting air into the vertical membrane storage system via the aerator air pipe;
    actuating the air release valve to release entrapped air in the sewage from the flexible membrane housing.

8. A submerged overflow storage system comprising:
    a. at least one vertical membrane storage system as claimed in claim 1;
    b. an inflow pipe connected to the receiving means of the at least one vertical membrane storage system;
    c. an inflow overflow valve disposed within the inflow pipe;
    d. an outflow pipe connected to the inflow pipe; and
    e. an outflow valve disposed within the inflow pipe and in fluid communication with the outflow pipe.

9. The submerged storage system as claimed in claim 8, further comprising a receiving means valve disposed within the receiving means of the at least one vertical membrane storage system, and a valve actuating means disposed within the receiving means for actuating the receiving means valve.

10. The submerged storage system as claimed in claim 8, wherein the outflow pipe is connected to a sewer system that is vertically disposed below the receiving means of the at least one vertical membrane storage system, the storage system further comprising a pump connected to the outflow pipe for pumping fluid from the at least one vertical membrane storage system to the outflow pipe.

11. A method of preventing overflow of sewage from a sewer system during periods of excess flow, comprising storing the excess flow in a submerged overflow storage system as claimed in claim 8 by actuating the inflow valve in the inflow pipe to divert flow from the sewer system into the at least one vertical membrane storage system.

12. A method of preventing invasive species transfer from the discharge of bilge and/or ballast water from a sea-going vessel comprising storing the bilge and/or ballast water into the submerged overflow storage system as claimed in claim 8 via the receiving means.

13. A portable submerged storage system submerged in a body of water comprising:
   a. at least one vertical membrane storage system as claimed in claim 1; and
   b. a connection tube connected to the receiving means of the at least one vertical membrane storage system.

14. A portable submerged storage system as claimed in claim 13, further comprising a receiving means valve disposed within the receiving means of the at least one vertical membrane storage system, and a valve actuating means disposed within the receiving means for actuating the receiving means valve.

15. A portable submerged storage system as claimed in claim 13, further comprising:
   c. an ambient floating skimmer at least partially submerged in the body of water; and
   d. a connector disposed between the connection tube and the ambient floating skimmer.

16. A method of containing an oil spill in a body of water comprising storing oil contaminated water in the portable submerged storage system as claimed in claim 15 by diverting the oil contaminated water from the surface of the body of water to the at least one vertical membrane storage system with the ambient floating skimmer.

17. A portable submerged storage system as claimed in claim 13, further comprising:
   c. a floating platform for connecting the portable submerged storage system to an external device, the floating platform comprising:
      an ambient connection tube disposed within the floating platform and connected to the connection tube;
      a platform connected to and supporting the ambient connection tube; and
      at least one floatation pontoon at least partially submerged in the body of water, and connected to the platform.

18. A method of storing a fluid comprising injecting a fluid into the vertical storage system as claimed in claim 1 via the receiving means.

19. A method of treating sewage with a sea worthy sewage treatment vessel comprising:
   storing sewage in the portable submerged storage system as claimed in claim 17;
   connecting the sea worthy sewage treatment vessel to the ambient connection tube; and withdrawing sewage from the portable submerged storage system.

* * * * *